US007425358B2

(12) United States Patent
Heuer et al.

(10) Patent No.: US 7,425,358 B2
(45) Date of Patent: Sep. 16, 2008

(54) COPOLYCARBONATES HAVING IMPROVED FLOWABILITY

(75) Inventors: Helmut-Werner Heuer, Krefeld (DE); Rolf Wehrmann, Krefeld (DE); Michael Erkelenz, Duisburg (DE); Alexander Meyer, Krefeld (DE); Melanie Möthrath, Düsseldorf (DE)

(73) Assignee: Bayer MaterialScience AG (DE)

( * ) Notice: Subject to any disclaimer, the term of this patent is extended or adjusted under 35 U.S.C. 154(b) by 238 days.

(21) Appl. No.: 11/116,567

(22) Filed: Apr. 28, 2005

(65) Prior Publication Data

US 2005/0250915 A1    Nov. 10, 2005

(30) Foreign Application Priority Data

May 7, 2004    (DE) .................. 10 2004 022 673

(51) Int. Cl.
*C08G 64/06*    (2006.01)
*G02B 1/04*    (2006.01)

(52) U.S. Cl. ..................... 428/64.7; 528/204
(58) Field of Classification Search .............. None
See application file for complete search history.

(56) References Cited

U.S. PATENT DOCUMENTS

| 3,886,218 A | 5/1975 | Biller et al. ............ 260/613 R |
| 4,638,099 A | 1/1987 | Riemann et al. ............ 568/638 |
| 4,675,457 A | 6/1987 | Vorwerk ............ 568/638 |
| 5,084,550 A | 1/1992 | Pakull et al. ............ 528/204 |
| 5,102,975 A * | 4/1992 | Riding ............ 528/204 |
| 5,126,428 A * | 6/1992 | Freitag et al. ............ 528/196 |
| 5,976,638 A * | 11/1999 | Picken ............ 428/1.3 |

FOREIGN PATENT DOCUMENTS

| GB | 1 592 724 | 7/1981 |
| JP | 53-77028 | 7/1978 |
| JP | 63-136051 | 6/1988 |
| JP | 08003307 | * 1/1996 |
| JP | 2002114842 | * 4/2002 |
| JP | 2002-167349 | 6/2002 |
| JP | 2003-160526 | 6/2003 |

OTHER PUBLICATIONS

Journal of Polymer Science: Part A: Polymer Chemistry, vol. 25(12), (month unavailable), 1987, pp. 3413-3422, A. Factor and J.C. Lynch, "The Synthesis, Characterization, and Weathering Behavior of Polycarbonates Derived from 3,3'-Dihydroxydiphenyl Ether".
Chemistry and Physics of Polycarbonates, Polymer Reviews, vol. 9, (month unavailable) 1964, pp. 99-112, by Hermann Schnell, "Structure and Properties of Aromatic Polycarbonates".
Database CA 'Online! Chemical Abstracts Service, Columbus, Ohio, US; Totani, Yoshuki et al: "Manufacture of aromatic polycarbonates in halogen-free solvents" XP002337120 gefunden im STN Database accession No. 124:262048 & JP 08 003307 A (Mitsui Toatsu Chemicals, Japan) Jan. 9, 1996.

* cited by examiner

*Primary Examiner*—David Buttner
(74) *Attorney, Agent, or Firm*—Connelly Bove Lodge & Hutz LLP

(57) ABSTRACT

An optical data storage comprising a thermoplastic copolycarbonate is disclosed. The copolycarbonate contains at least one unit derived from dihydroxydiphenyl ether and at least one unit derived from at least one member selected from the group consisting of 4,4'dihydroxybiphenyl and 1,1-bis-(4-hydroxyphenyl)-3,3,5-trimethylcyclohexane.

1 Claim, No Drawings

COPOLYCARBONATES HAVING IMPROVED FLOWABILITY

FIELD OF THE INVENTION

The invention relates to copolycarbonates and to a process for their preparation.

TECHNICAL BACKGROUND OF THE INVENTION

Aromatic polycarbonates belong to the group of the industrial thermoplastics. They are distinguished by the fact that they combine the technologically important properties of transparency, dimensional stability under heat and toughness.

In order to obtain high molecular weight polycarbonates by the interfacial process, the alkali salts of bisphenols are reacted with phosgene in a two-phase mixture. The molecular weight may be controlled by the amount of monophenols such as, for example, phenol or tert.-butylphenol. These reactions yield almost exclusively linear polymers. This may be demonstrated by end-group analysis. By the specific use of so-called branching agents, generally polyhydroxylated compounds, branched polycarbonates are also obtained in these reactions.

Regarding the preparation of polycarbonates by the interfacial process, reference is made by way of example to H. Schnell, Chemistry and Physics of Polycarbonates, Polymer Reviews, Vol. 9, Interscience Publishers, New York 1964 p. 33 ff and to Polymer Reviews, Vol. 10, "Condensation Polymers by Interfacial and Solution Methods", Paul W. Morgan, Interscience Publishers, New York 1965, Chap. VIII, p. 325.

For the preparation of polycarbonates by the melt transesterification process, the bisphenols are reacted in the melt with diaryl carbonates, mostly diphenyl carbonate, in the presence of catalysts, such as alkali salts, ammonium or phosphonium compounds.

The melt transesterification process is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964) and also in DE-C 10 31 512.

However, the known polycarbonates and copolycarbonates are unsatisfactory owing to their high melt viscosities or have the disadvantage that they may be limited in use to the production of molded articles having a large surface area, such as, for example, motor vehicle windscreens, or may not be optimally suitable.

SUMMARY OF THE INVENTION

A copolycarbonate having improved flowability and processes for its preparation is disclosed. The molecular structure of the copolycarbonate includes at least one unit derived from at least one dihydroxy compound selected from the group consisting of compounds of formula (1)

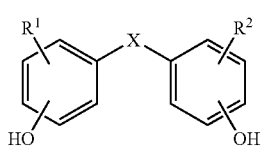

(1)

in which
$R^1$ and $R^2$ each independently of the other represents hydrogen or linear or branched $C_1$-$C_{10}$-alkyl, and X represents O or S.

DETAILED DESCRIPTION OF THE INVENTION

The object was, therefore, to provide copolycarbonates and processes for their preparation which avoid these disadvantages. This object is achieved, surprisingly, by the use of one or more compounds of the general formula (1)

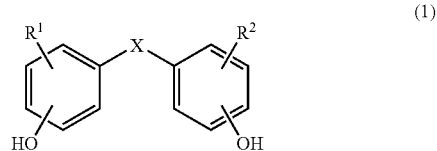

(1)

in which
$R^1$ and $R^2$ represent hydrogen or linear or branched $C_1$-$C_{10}$-alkyl, preferably hydrogen or linear or branched $C_1$-$C_6$-alkyl, particularly preferably hydrogen or linear or branched $C_1$-$C_4$-alkyl, very particularly preferably hydrogen or methyl, and
X represents O or S.

The present invention accordingly provides copolycarbonates containing at least two different bisphenols as monomers, one bisphenol being selected from at least one of the compounds of formula (1)

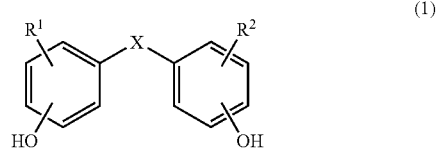

(1)

in which
$R^1$ and $R^2$ represent hydrogen or linear or branched $C_1$-$C_{10}$-alkyl, preferably hydrogen or linear or branched $C_1$-$C_6$-alkyl, particularly preferably hydrogen or linear or branched $C_1$-$C_4$-alkyl, very particularly preferably hydrogen or methyl, and
X represents O or S.

The present invention further provides the bisphenols of the compounds of formula (1)

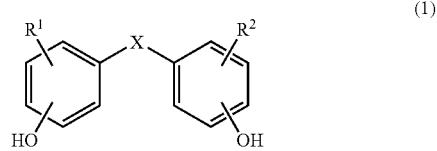

(1)

in which
$R^1$ and $R^2$ represent hydrogen or linear or branched $C_1$-$C_{10}$-alkyl, preferably hydrogen or linear or branched $C_1$-$C_6$-alkyl, particularly preferably hydrogen or linear or branched $C_1$-$C_4$-alkyl, very particularly preferably hydrogen or methyl, and
X represents O or S.

Particularly preferred compounds of formula (1) are compounds of formulae (1a) and (1b)

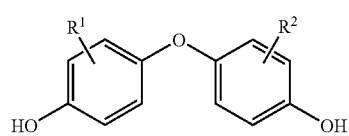

(1a)

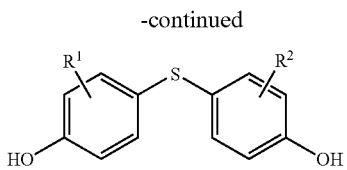

(1b)

in which
$R^1$ and $R^2$ are as defined above.

Very particular preference is given to the compounds described by formulae (1c) and (1d):

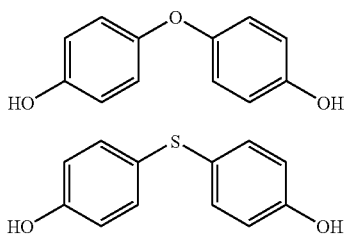

Surprisingly, it has been found that the melt viscosity of the resulting copolycarbonates exhibits lower values than in the prior art both at low and at relatively high shear rates (with the molecular weight being otherwise comparable). This is important especially for the production of relatively large injection-molded parts, such as, for example, motor vehicle windscreens. Filling of the molds using conventional injection-molding machines is more readily possible as a result.

The diphenols of formula (1a) which may be used in accordance with the invention are known in the literature. The preparation of these substances is described, for example, in DE-A 22 37 762, DE-A 35 32 881, JP-A 2002 16 73 49 and JP-A 2003 16 05 26. The properties of a homopolycarbonate based thereon are described in H. Schnell, Chemistry and Physics of Polycarbonates, Polymer Reviews, Vol. 9, Interscience Publishers, New York 1964 p. 99 ff.

The preparation of 3,3'-dihydroxydiphenyl ether is described, for example, in Journal of Polymer Science, Part A, 1987, 25 (12), p. 3413-3422.

The preparation of 3,4'-dihydroxydiphenyl ether is described, for example, in JP-A 53 07 70 28.

In principle, the 4,4'-hydroxy-substituted diphenyl ethers or diphenyl ether derivatives may be prepared by dimerization of hydroquinone or substituted hydroquinone derivatives, in which the reactants are made to react in the presence of a catalyst, such as, for example, an acidic ion exchanger. A further possibility is the reaction of halo-substituted phenols in a modified Ullmann reaction, in which the reactants are made to react under the action of copper salts, such as, for example, CuCl. In this manner the meta-linked derivatives, for example, are also obtainable.

The particularly preferred compounds are known (e.g. in A. Riemann, W. Ude, Ger. Offen. (1986), DE-A 3506845 or in Y. Kawamorita, M. Hisamura, Jpn. Kokai Tokkyo Koho (1988), JP-A 63136051). On the other hand, the prior art teaches nothing about improving the flowability of corresponding copolycarbonates.

The amount of the bisphenols according to the invention in the copolycarbonate is generally from 0.1 to 40 mol. %, preferably from 1 to 30 mol. %, particularly preferably from 5 to 25 mol. % and very particularly preferably from 10 to 20 mol. %, relative to the molar amount of the aromatic dihydroxy compounds need in the preparation of the copolycarbonate.

The copolycarbonates prepared using the described bisphenols of formula (1) and containing the structural units —O-D-O— derived from the compounds of formula 1 are represented, for example, but not exclusively, by the general formula (2)

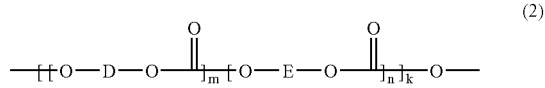

wherein the radical O-E-O represents any desired diphenolate radicals excluding diphenolates based on the dihydroxy compounds of the formula (1)

in which each -E- independently of any others represents an aromatic radical having from 6 to 40 carbon atoms, preferably from 6 to 35 carbon atoms, particularly preferably from 6 to 30 carbon atoms and very particularly preferably from 6 to 25 carbon atoms, which radical may contain one or more aromatic or condensed aromatic nuclei optionally containing hetero atoms and may be substituted by $C_1$-$C_{12}$-alkyl radicals, preferably by $C_1$-$C_{10}$-alkyl radicals, particularly preferably by $C_1$-$C_8$-alkyl radicals and very particularly preferably by $C_1$-$C_6$-alkyl radicals, or by halogen, preferably fluorine, chlorine or bromine, particularly preferably fluorine or chlorine, very particularly preferably fluorine, and may contain aliphatic radicals, cycloaliphatic radicals, aromatic nuclei or hetero atoms as bridging members, and k represents an integer from 1 to 1000, preferably from 1 to 800, particularly preferably from 5 to 600 and very particularly preferably from 10 to 500 and especially preferably from 15 to 300, m represents a fraction z/k and n represents a fraction (k-z)/k, wherein z represents numbers from 1 to k.

Preferred diphenolate units of the branched copolycarbonates according to the invention are derived from general structures of formula (3) wherein the underlying diphenolate radicals are shown in brackets,

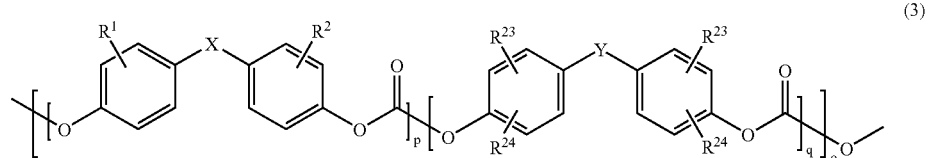

in which

R²³ and R²⁴ each independently of the other represents H, linear or branched $C_1$-$C_{18}$-alkyl or -alkoxy radicals, halogen such as Cl or Br, or an optionally substituted aryl or aralkyl radical, preferably H or linear or branched $C_1$-$C_{12}$-alkyl radicals, particularly preferably H or $C_1$-$C_8$-alkyl radicals and very particularly preferably H or methyl, R¹ and R² represent linear or branched $C_1$-$C_{10}$-alkyl, preferably linear $C_1$-$C_{10}$-alkyl, particularly preferably linear $C_1$-$C_8$-alkyl and very particularly preferably linear $C_1$-$C_6$-alkyl, and X represents O or S, Y represents a single bond, —$SO_2$—, —CO—, a $C_1$- to $C_6$-alkylene, $C_2$- to $C_5$-alkylidene, $C_5$- to $C_6$-cycloalkylidene radical which may be substituted by $C_1$- to $C_6$-alkyl, preferably methyl or ethyl radicals, or a $C_6$- to $C_{12}$-arylene radical, and o represents an integer from 1 to 1000, preferably from 1 to 800, particularly preferably from 5 to 600 and very particularly preferably from 10 to 500 and especially preferably from 15 to 300, and p represents a fraction z/o and q represents a fraction (o-z)/o, wherein z represents numbers from 1 to o.

The diphenolate radicals O-E-O in formula (2) and the diphenolate radicals in the part indicated by the subscript q in formula (3) are particularly preferably derived from the suitable diphenols mentioned hereinbelow.

There may be mentioned as examples of the diphenols which, in addition to the mentioned bisphenols, underlie the general formulae (2) and (3) hydroquinone, resorcinol, dihydroxybiphenyls, bis-(hydroxyphenyl)-alkanes, bis-(hydroxyphenyl)-cycloalkanes, bis-(hydroxyphenyl)sulfides, bis-(hydroxyphenyl)ethers, bis-(hydroxyphenyl)ketones, bis-(hydroxyphenyl)-sulfones, bis-(hydroxyphenyl)sulfoxides, α,α'-bis-(hydroxyphenyl)-diisopropylbenzenes and compounds thereof alkylated and halogenated at the nucleus, and also α,ω-bis-(hydroxyphenyl)-polysiloxanes.

Preferred diphenols are, for example, 4,4'-dihydroxybiphenyl (DOD), 2,2-bis-(4-hydroxyphenyl)-propane (bisphenol A), 1,1-bis-(4-hydroxyphenyl)-3,3,5-trimethylcyclohexane (bisphenol TMC), 1,1-bis-(4-hydroxyphenyl)-cyclohexane, 2,4-bis-(4-hydroxyphenyl)-2-methylbutane, 1,1-bis-(4-hydroxyphenyl)-1-phenylethane, 1,1-bis[2-(4-hydroxyphenyl)-2-propyl]-benzene, 1,3-bis[2-(4-hydroxyphenyl)-2-propyl]-benzene (bisphenol M), 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 2,2-bis-(3,5-dichloro-4-hydroxyphenyl)-propane and 2,2-bis-(3,5-dibromo-4-hydroxyphenyl)-propane.

Particularly preferred diphenols are, for example, 2,2-bis-(4-hydroxyphenyl)-propane (bisphenol A), 4,4'-dihydroxybiphenyl (DOD), 1,3-bis[2-(4-hydroxyphenyl)-2-propyl]-benzene (bisphenol M), 2,2-bis-(3,5-dimethyl-4-hydroxyphenyl)-propane, 1,1-bis-(4-hydroxyphenyl)-1-phenylethane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC).

Very particular preference is given to 2,2-bis-(4-hydroxyphenyl)-propane (bisphenol A), 4,4'-dihydroxybiphenyl (DOD), 1,3-bis[2-(4-hydroxyphenyl)-2-propyl]-benzene (bisphenol M) and 1,1-bis-(4-hydroxyphenyl)-3,3,5-trimethylcyclohexane (bisphenol TMC).

Very special preference is given especially to 2,2-bis-(4-hydroxyphenyl)-propane (bisphenol A) and 1,1-bis-(4-hydroxyphenyl)-3,3,5-trimethylcyclohexane (bisphenol TMC).

The diphenols may be used either alone or in a mixture with one another; both homopolycarbonates and copolycarbonates are included. The diphenols are known in the literature or may be prepared according to processes known in the literature (see e.g. H. J. Buysch et al., Ullmann's Encyclopedia of Industrial Chemistry, VCH, New York 1991, 5th Ed., Vol. 19, p. 348).

The polycarbonates and copolycarbonates may also be branched. For that purpose there are added as so-called branching agents specific small amounts, preferably amounts from 0.05 to 5 mol. %, particularly preferably from 0.1 to 3 mol. %, very particularly preferably from 0.1 to 2 mol. %, based on moles of diphenols used, of trifunctional compounds such as, for example, isatin biscresol (IBC) or phloroglucinol, 4,6-dimethyl-2,4,6-tri-(4-hydroxyphenyl)-2-heptene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane (THPE); tri-(4-hydroxyphenyl)-phenylmethane; 2,2-bis-[4,4-bis-(4-hydroxyphenyl)-cyclohexyl]-propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2,4-dihydroxyphenyl)-propane; hexa-(4-(4-hydroxyphenyl-isopropyl)-phenyl)-orthoterephthalic acid ester; tetra-(4-hydroxyphenyl)-methane; tetra-(4-(4-hydroxyphenyl-isopropyl)-phenoxy)-methane; α,α',α"-tris-(4-hydroxyphenyl)-1,3,5-triisopropylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)-methyl)-benzene and, especially, 1,1,1-tri-(4-hydroxyphenyl)-ethane and bis-(3-methyl-4-hydroxyphenyl)-2-oxo-2,3-dihydroindole. Isatin biscresol and also 1,1,1-tri-(4-hydroxyphenyl)-ethane and bis-(3-methyl-4-hydroxyphenyl)-2-oxo-2,3-dihydroindole are preferably used as branching agents.

The use of these branching agents yields branched structures. The resulting long-chain branching results in most cases in rheological properties of the resulting polycarbonates, which manifests itself as an intrinsic viscosity as compared with linear types.

The present invention relates further to a process for the preparation of the copolycarbonates of formulae (2) and (3) according to the invention, which process is characterised in that bisphenols and, optionally, branching agents are dissolved in aqueous alkaline solution and made to react with a carbonate source such as phosgene, optionally dissolved in a solvent, in a two-phase mixture consisting of an aqueous alkaline solution, an organic solvent and a catalyst, preferably an amine compound. It is also possible to carry out the reaction in several steps. Such processes for the preparation of polycarbonate are known in principle as two-phase interfacial processes, for example from H. Schnell, Chemistry and Physics of Polycarbonates, Polymer Reviews, Vol. 9, Interscience Publishers, New York 1964 p. 33 ff and Polymer Reviews, Vol. 10, "Condensation Polymers by Interfacial and Solution Methods", Paul W. Morgan, Interscience Publishers, New York 1965, Chap. VIII, p. 325, and the conditions underlying such processes are therefore well known to the person skilled in the art.

The concentration of the bisphenols in the aqueous alkaline solution is from 2 to 25 wt. %, preferably from 2 to 20 wt. %, particularly preferably from 2 to 18 wt. % and very particularly preferably from 3 to 15 wt. %. The aqueous alkaline solution consists of water in which hydroxides of alkali or alkaline earth metals are dissolved. Sodium and potassium hydroxides are preferred.

When phosgene is used as the carbonate source, the ratio by volume of aqueous alkaline solution to organic solvent is from 5:95 to 95:5, preferably from 20:80 to 80:20, particularly preferably from 30:70 to 70:30 and very particularly preferably from 40:60 to 60:40. The molar ratio of bisphenol to phosgene is less than 1:10, preferably less than 1:6, particularly preferably less than 1:4 and very particularly preferably less than 1:3. The concentration of the branched polycarbonates and copolycarbonates according to the invention in the organic phase is from 1.0 to 25 wt. %, preferably from 2 to 20 wt. %, particularly preferably from 2 to 18 wt. % and very particularly preferably from 3 to 15 wt. %.

The concentration of the amine compound, based on the amount of bisphenol used, is from 0.1 to 10 mol. %, preferably from 0.2 to 8 mol. %, particularly preferably from 0.3 to 6 mol. % and very particularly preferably from 0.4 to 5 mol. %.

Bisphenols are to be understood as being the above-mentioned diphenols, with contents of the above-mentioned branching agents. The carbonate source is phosgene, diphosgene or triphosgene, preferably phosgene. When phosgene is used, it is possible, if desired, to dispense with a solvent and to introduce the phosgene directly into the reaction mixture.

There may be used as the catalyst tertiary amines such as triethylamine or N-alkylpiperidines. Suitable catalysts are trialkylamines and 4-(dimethylamino)pyridine. Triethylamine, tripropylamine, triisopropylamine, tributylamine, triisobutylamine, N-methylpiperidine, N-ethylpiperidine and N-propylpiperidine are particularly suitable.

There are suitable as the organic solvent halogenated hydrocarbons such as methylene chloride and/or chlorobenzene, dichlorobenzene, trichlorobenzene or mixtures thereof, or aromatic hydrocarbons, such as, for example, toluene or xylenes.

The reaction temperature may be from −5° C. to 100° C., preferably from 0° C. to 80° C., particularly preferably from 10° C. to 70° C. and very particularly preferably from 10° C. to 60° C.

Alternatively, the polycarbonates according to the invention may also be prepared by the melt transesterification process. The melt transesterification process is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964) and DE-C 10 31 512.

In the melt transesterification process, the aromatic dihydroxy compounds already described in connection with the interfacial process are transesterified in the melt with carbonic acid diesters with the aid of suitable catalysts and, optionally, further additives. Carbonic acid diesters within the scope of the invention are those of formulae (4) and (5)

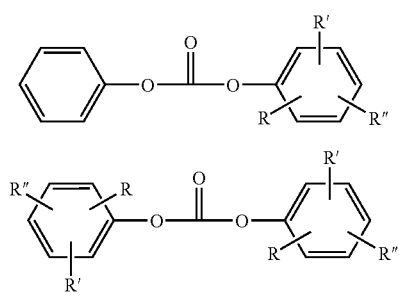

wherein

R, R' and R" each independently of the others may represent H, $C_1$-$C_{34}$-alkyl or $C_5$-$C_{10}$-cycloalkyl, $C_7$-$C_{34}$-alkaryl or $C_6$-$C_{34}$-aryl, $C_1$-$C_{15}$-alkyl, $C_5$- or $C_6$-cycloalkyl, preferably each independently of the others represents H, $C_1$-$C_{16}$-alkyl or $C_5$-$C_6$-cycloalkyl, $C_7$-$C_{16}$-alkaryl or $C_6$-$C_{16}$-aryl, particularly preferably R, R' and R" represent H.

There may be mentioned by way of example:

diphenyl carbonate, butylphenyl-phenyl carbonate, di-butylphenyl carbonate, isobutylphenyl-phenyl carbonate, di-isobutylphenyl carbonate, tert.-butylphenyl-phenyl carbonate, di-tert.-butylphenyl carbonate, n-pentylphenyl-phenyl carbonate, di-(n-pentylphenyl)carbonate, n-hexylphenyl-phenyl carbonate, di-(n-hexylphenyl)carbonate, cyclohexylphenyl-phenyl carbonate, di-cyclohexylphenyl carbonate, phenylphenol-phenyl carbonate, di-phenylphenol carbonate, isooctylphenyl-phenyl carbonate, di-isooctylphenyl carbonate, n-nonylphenyl-phenyl carbonate, di-(n-nonylphenyl)carbonate, cumylphenyl-phenyl carbonate, di-cumylphenyl carbonate, naphthylphenyl-phenyl carbonate, di-naphthylphenyl carbonate, di-tert.-butylphenyl-phenyl carbonate, di-(di-tert.-butylphenyl)carbonate, dicumylphenyl-phenyl carbonate, di-(dicumylphenyl)carbonate, 4-phenoxyphenyl-phenyl carbonate, di-(4-phenoxyphenyl)carbonate, 3-pentadecylphenyl-phenyl carbonate, di-(3-pentadecylphenyl)carbonate, tritylphenyl-phenyl carbonate, di-tritylphenyl carbonate, preferably diphenyl carbonate, tert.-butylphenyl-phenyl carbonate, di-tert.-butylphenyl carbonate, phenylphenol-phenyl carbonate, di-phenylphenol carbonate, cumylphenyl-phenyl carbonate, di-cumylphenyl carbonate, particularly preferably diphenyl carbonate.

It is also possible to use mixtures of the mentioned carbonic acid diesters.

The amount of carbonic acid esters is from 100 to 130 mol. %, preferably from 103 to 120 mol. %, particularly preferably from 103 to 109 mol. %, based on the dihydroxy compound.

As catalysts within the scope of the invention there are used in the melt transesterification process, as in the mentioned literature, basic catalysts such as, for example, alkali and alkaline earth hydroxides and oxides, as well as ammonium or phosphonium salts, which are referred to hereinbelow as onium salts. Preference is given to the use of onium salts, particularly preferably phosphonium salts. Phosphonium salts within the scope of the invention are those of formula (6)

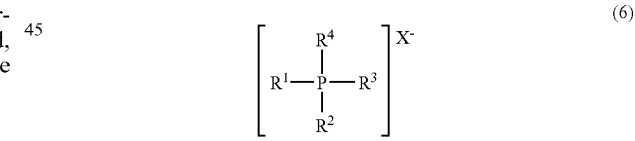

wherein $R^{1-4}$ each independently of the others represents $C_1$-$C_{10}$-alkyl, $C_6$-$C_{10}$-aryl, $C_7$-$C_{10}$-aralkyl or $C_5$-$C_6$-cycloalkyl, preferably methyl or $C_6$-$C_{14}$-aryl, particularly preferably methyl or phenyl, and $X^-$ is an anion such as hydroxide, sulfate, hydrogen sulfate, hydrogen carbonate, carbonate, a halide, preferably chloride, or an alcoholate of formula OR, wherein R may be $C_6$-$C_{14}$-aryl or $C_7$-$C_{12}$-aralkyl, preferably phenyl.

Preferred catalysts are tetraphenylphosphonium chloride, tetraphenylphosphonium hydroxide, tetraphenylphosphonium phenolate, particularly preferably tetraphenylphosphonium phenolate.

The catalysts are preferably used in amounts of from $10^{-8}$ to $10^{-3}$ mol., particularly preferably from $10^{-7}$ to $10^{-4}$ mol., based on one mole of bisphenol.

Further catalysts may be used on their own or, optionally, in addition to the onium salt in order to increase the rate of polymerisation. Such catalysts include salts of alkali metals and alkaline earth metals, such as hydroxides, alkoxides and aryl oxides of lithium, sodium and potassium, preferably hydroxide, alkoxide or aryl oxide salts of sodium. Sodium hydroxide and sodium phenolate are most preferred. The amounts of the co-catalyst may be in the range of from 1 to 200 ppb, preferably from 5 to 150 ppb and most preferably from 10 to 125 ppb, in each case calculated as sodium.

The transesterification reaction of the aromatic dihydroxy compound and the carbonic acid diester in the melt is preferably carried out in two steps. In the first step, melting of the aromatic dihydroxy compound and of the carbonic acid diester is carried out at temperatures of from 80 to 250° C., preferably from 100 to 230° C., particularly preferably from 120 to 190° C., under normal pressure and in a period of from 0 to 5 hours, preferably from 0.25 to 3 hours. After addition of the catalyst, the oligocarbonate is prepared from the aromatic dihydroxy compound and the carbonic acid diester by applying a vacuum (up to 2 mm Hg) and raising the temperature (to up to 260° C.) by distilling off the monophenol. The major amount of vapours from the process is obtained thereby. The oligocarbonate so prepared has a mean molar mass $M_W$ (determined by measurement of the rel. solution viscosity in dichloromethane or in mixtures of equal amounts by weight of phenol/o-dichlorobenzene, calibrated by light scattering) in the range of from 2000 g/mol. to 18,000 g/mol., preferably from 4000 g/mol. to 15,000 g/mol.

In the second step, the polycarbonate is prepared in the polycondensation by raising the temperature further to 250 to 320° C., preferably 270 to 295° C., and a pressure of <2 mm Hg. The remainder of the vapours are removed from the process thereby.

The catalysts may also be used in combination (two or more) with one another.

When alkali/alkaline earth metal catalysts are used, it may be advantageous to add the alkali/alkaline earth metal catalysts at a later time (e.g. after the oligocarbonate synthesis during the polycondensation in the second step).

Within the scope of the process according to the invention, the reaction of the aromatic dihydroxy compound and the carbonic acid diester to form the polycarbonate may be carried out discontinuously or, preferably, continuously, for example in stirred vessels, thin-layer evaporators, falling film evaporators, stirred vessel cascades, extruders, kneaders, simple disc reactors and high-viscosity disc reactors.

Analogously to the interfacial process, branched polycarbonates or copolycarbonates may be prepared by the use of polyfunctional compounds.

The mean molecular weights ($\overline{M}_w$) of the branched polycarbonates and copolycarbonates according to the invention are in the range of from 6000 to 200,000 g/mol., preferably from 6000 to 100,000 g/mol., particularly preferably from 10,000 to 80,000 g/mol. and very particularly preferably from 12,000 to 70,000 g/mol. (determined by means of GPC and polycarbonate calibration).

Preference, particular preference or very particular preference is given to embodiments which make use of the parameters, compounds, definitions and explanations mentioned under preferred, particularly preferred or very particularly preferred, or under preferably etc.

However, the definitions, parameters, compounds and explanations mentioned generally in the description or in preferred ranges may also be combined with one another as desired, that is to say between the respective ranges and preferred ranges.

The copolycarbonates according to the invention may be worked up in known manner and processed to form any desired molded articles, for example by extrusion, injection molding or extrusion blow-molding.

Other aromatic polycarbonates and/or other aromatic polyester carbonates and/or other aromatic polyesters may be added to the copolycarbonates according to the invention in known manner, for example by compounding.

It is also possible to add to the polycarbonates and copolycarbonates according to the invention the additives conventional for such thermoplastics, such as fillers, UV stabilisers, heat stabilisers, antistatics and pigments, in the usual amounts; the mold release behaviour, flow behaviour and/or flame resistance may optionally be improved by the addition of external mold release agents, flow improvers and/or flameproofing agents (e.g. alkyl and aryl phosphites, phosphates, phosphanes, low molecular weight carboxylic acid esters, halogen compounds, salts, chalk, quartz flour, glass fibres and carbon fibres, pigments and combinations thereof. Such compounds are described, for example, in WO 99/55772, p. 15-25, and in the appropriate chapters of the "Plastics Additives Handbook", ed. Hans Zweifel, 5th Edition 2000, Hanser Publishers, Munich).

The polycarbonates and copolycarbonates according to the invention, optionally in admixture with other thermoplastics and/or conventional additives, can, when processed to form any desired molded articles/extrudates, be used wherever polycarbonates, polyester carbonates and polyesters that are already known are used. On account of their property profile they are suitable especially as materials for the injection molding of larger moldings, for example motor vehicle windscreens. However, because of their low water absorption and the improved dimensional stability associated therewith, they are also particularly suitable as substrate materials for optical data storage means such as, for example, CDs, CD-Rs, DVDs, DVD-Rs, Blue-ray discs or advanced optical discs (AODs), but they may also be used, for example, as films in the electronics sector, as moldings in vehicle manufacture and as sheets for coverings in the safety sector. Further possible applications of the polycarbonates according to the invention are:

1. Safety glazing, which, as is known, is required in many areas of buildings, vehicles and aircraft, and also as visors for helmets.

2. Production of films, especially ski films.

3. Production of blow-molded articles (see, for example, U.S. Pat. No. 2,964,794), for example 1 to 5 gallon water bottles.

4. Production of transparent sheets, especially of hollow-chamber sheets, for example for covering buildings such as railway stations, greenhouses and lighting installations.

5. Production of optical data storage means.

6. For the production of traffic light housings or road signs.

7. For the production of foamed materials (see, for example, DE-B 1 031 507).

8. For the production of threads and wires (see, for example, DE-B 1 137 167 and DE-A 1 785 137).

9. As translucent plastics having a content of glass fibres for lighting purposes (see, for example, DE-A 1 554 020).

10. As translucent plastics having a content of barium sulfate, titanium dioxide and/or zirconium oxide or organic polymeric acrylate rubbers (EP-A 634 445, EP-A 269324) for the production of transparent and light-scattering moldings.

11. For the production of precision injection-molded parts, such as, for example, lens holders. To that end, polycarbonates having a content of glass fibres are used, which optionally contain in addition approximately from 1 to 10 wt. % MoS₂, based on the total weight.

12. For the production of parts for optical devices, especially lenses for photographic and film cameras (see, for example, DE-A 2 701 173).

13. As light transmission carriers, especially as fibre-optic cables (see, for example, EP-A 0 089 801).

14. As electrical insulating materials for electrical conductors and for plug housings as well as plug connectors.

15. Production of mobile telephone casings having improved resistance to perfume, aftershave and perspiration.

16. Network interface devices.

17. As carrier material for organic photoconductors.

18. For the production of lamps, for example headlight lamps in the form of headlamps, headlight lenses or internal lenses.

19. For medical applications, for example oxygenators, dialysers.

20. For foodstuffs applications, such as, for example, bottles, kitchenware and chocolate molds.

21. For applications in the automotive sector, where contact with fuels and lubricants may occur, such as, for example, bumpers, optionally in the form of suitable blends with ABS or suitable rubbers.

22. For sports articles, such as, for example, slalom poles or ski boot buckles.

23. For domestic articles, such as, for example, kitchen sinks and letter box casings.

24. For casings, such as, for example, electrical distribution cabinets.

25. Casings for electric toothbrushes and hairdryer casings.

26. Transparent washing machines—bull's-eyes having improved resistance to the washing solution.

27. Safety goggles, visors or optical corrective spectacles.

28. Lamp covers for kitchen appliances having improved resistance to cooking steam, especially oil vapours.

29. Packaging films for medicaments.

30. Chip boxes and chip carriers.

31. For other applications, such as, for example, stable doors or animal cages.

32. Protective helmets.

This Application also provides the molded articles and extrudates produced from the polymers according to the invention.

The Examples which follow are intended to illustrate the invention without limiting it.

EXAMPLES

Example 1

Synthesis of a copolycarbonate from bisphenol A/4,4'-dihydroxydiphenyl ether (Molar Ratio 50:50)

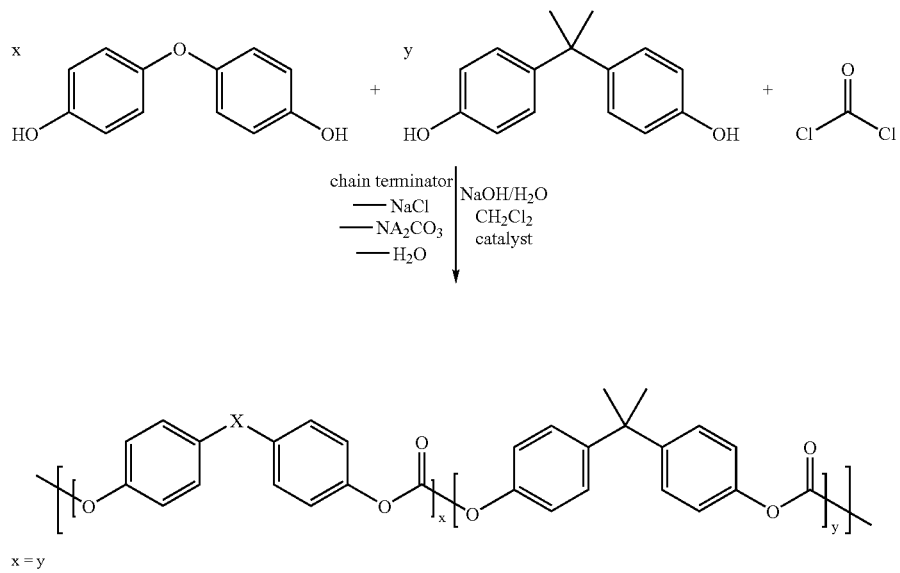

126 ml of methylene chloride are added to a solution, rendered inert with nitrogen, of 8.088 g (0.04 mol.) of 4,4'-dihydroxydiphenyl ether and 9.132 g (0.04 mol.) of bisphenol A as well as 7.04 g (0.176 mol.) of sodium hydroxide in 126 ml of water. In a one-step procedure, 0.42 g (0.0028 mol. or 3.5 mol. % relative to bisphenol) of p-tert.-butylphenol (BUP) are added as chain terminator. At a pH value of 14 and at room temperature, 11 ml (15.8 g, 0.16 mol.) of phosgene are added in the course of 10 minutes. In order to prevent the pH value from falling below 12, 25% sodium hydroxide solution was added during the phosgenation. When the phosgenation is complete, and after rinsing with nitrogen, 0.11 ml (0.0008 mol., 1 mol. % relative to bisphenol) of n-ethylpiperidine is added as catalyst, and stirring is then carried out for one hour. The aqueous phase is separated off, and the organic phase is acidified with phosphoric acid and washed with distilled water until neutral and free of salt. Precipitation of the polymer in methanol and drying yield 5.76 g of polycarbonate.

Analysis:

relative solution viscosity in methylene chloride at 25° C. (0.5 g/100 ml of solution): 1.176/1.176.

GPC (calibration against BPA polycarbonate): molecular weight $\overline{M}$ w=13964, $\overline{M}$ n=7897, heterogeneity D=1.77)
glass transition temperature $T_g$: 136° C.

Example 2

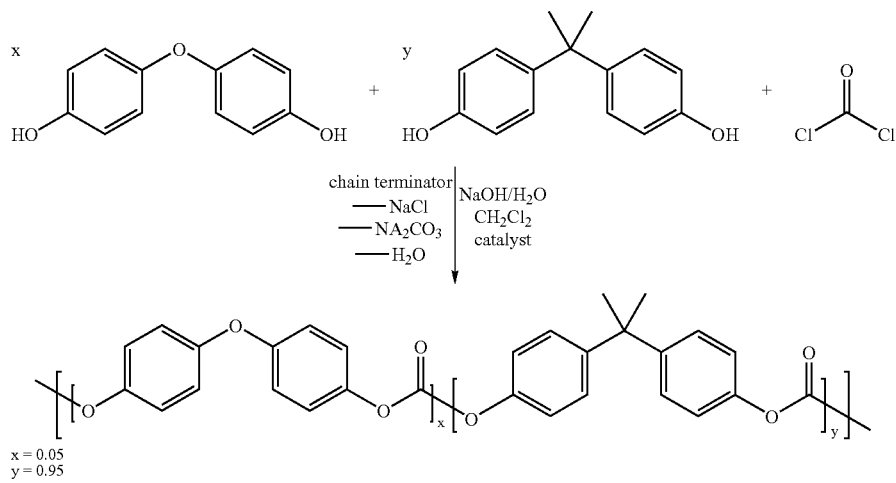

Synthesis of a copolycarbonate from bisphenol A/4,4'-dihydroxydiphenyl ether (Molar Ratio 95:5)

131 ml of methylene chloride are added to a solution, rendered inert with nitrogen, of 0.809 g (0.004 mol.) of 4,4'-dihydroxydiphenyl ether and 17.35 g (0.076 mol.) of bisphenol A as well as 7.04 g (0.176 mol.) of sodium hydroxide in 131 ml of water. In a one-step procedure, 0.36 g (0.0024 mol. or 3.0 mol. % relative to bisphenol) of p-tert.-butylphenol (BUP) are added as chain terminator. At a pH value of 14 and at room temperature, 11 ml (15.8 g, 0.16 mol.) of phosgene are added in the course of 10 minutes. In order to prevent the pH value from falling below 12, 25% sodium hydroxide solution was added during the phosgenation. When the phosgenation is complete, and after rinsing with nitrogen, 0.11 ml (0.0008 mol., 1 mol. % relative to bisphenol) of n-ethylpiperidine is added as catalyst, and stirring is then carried out for one hour. The aqueous phase is separated off, and the organic phase is acidified with phosphoric acid and washed with distilled water until neutral and free of salt. Precipitation of the polymer in methanol and drying yield 19.0 g of polycarbonate.

Analysis:
relative solution viscosity in methylene chloride at 25° C. (0.5 g/100 ml of solution): 1.339/1.338.
GPC (calibration against BPA polycarbonate): molecular weight $\overline{M}$ w=33509, $\overline{M}$ n=13308, heterogeneity D=2.52)
glass transition temperature $T_g$: 150° C.

Example 3

Synthesis of a copolycarbonate from bisphenol A/4,4'-dihydroxydiphenyl ether (Molar Ratio 90:10)

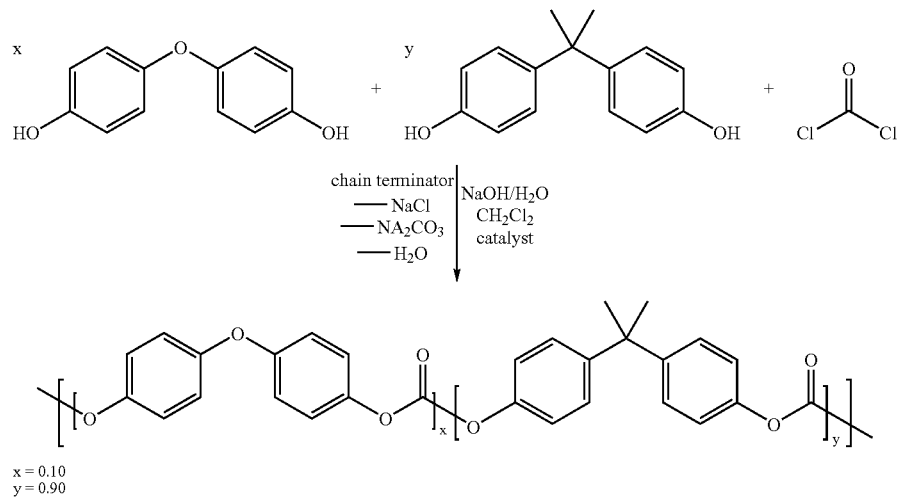

131 ml of methylene chloride are added to a solution, rendered inert with nitrogen, of 1.618 g (0.008 mol.) of 4,4'-dihydroxydiphenyl ether and 16.438 g (0.072 mol.) of bisphenol A as well as 7.04 g (0.176 mol.) of sodium hydroxide in 131 ml of water. In a one-step procedure, 0.36 g (0.0024 mol. or 3.0 mol. % relative to bisphenol) of p-tert.-butylphenol (BUP) are added as chain terminator. At a pH value of 14 and at room temperature, 11 ml (15.8 g, 0.16 mol.) of phosgene are added in the course of 10 minutes. In order to prevent the pH value from falling below 12, 25% sodium hydroxide solution was added during the phosgenation. When the phosgenation is complete, and after rinsing with nitrogen, 0.11 ml (0.0008 mol., 1 mol. % relative to bisphenol) of n-ethylpiperidine is added as catalyst, and stirring is then carried out for one hour. The aqueous phase is separated off, and the organic phase is acidified with phosphoric acid and washed with distilled water until neutral and free of salt. Precipitation of the polymer in methanol and drying yield 17.29 g of polycarbonate.

Analysis:

relative solution viscosity in methylene chloride at 25° C. (0.5 g/100 ml of solution): 1.301/1.303.

GPC (calibration against BPA polycarbonate): molecular weight $\overline{M}_w$=29570, $\overline{M}_n$=13904, heterogeneity D=2.13)

glass transition temperature $T_g$: 151° C.

Example 4

Synthesis of a copolycarbonate from bisphenol TMC/4,4'-dihydroxydiphenyl ether (Molar Ratio 50:50)

130 ml of methylene chloride are added to a solution, rendered inert with nitrogen, of 7.077 g (0.035 mol.) of 4,4'-dihydroxydiphenyl ether and 10.87 g (0.035 mol.) of bisphenol TMC as well as 6.16 g (0.154 mol.) of sodium hydroxide in 130 ml of water. In a one-step procedure, 0.368 g (0.0024 mol. or 3.5 mol. % relative to bisphenol) of p-tert.-butylphenol (BUP) are added as chain terminator. At a pH value of 14 and at room temperature, 9.7 ml (13.8 g, 0.14 mol.) of phosgene are added in the course of 10 minutes. In order to prevent the pH value from falling below 12, 25% sodium hydroxide solution was added during the phosgenation. When the phosgenation is complete, and after rinsing with nitrogen, 0.10 ml (0.0007 mol., 1 mol. % relative to bisphenol) of n-ethylpiperidine is added as catalyst, and stirring is then carried out for one hour. The aqueous phase is separated off, and the organic phase is acidified with phosphoric acid and washed with distilled water until neutral and free of salt. Precipitation of the polymer in methanol and drying yield 14.08 g of polycarbonate.

Analysis:

relative solution viscosity in methylene chloride at 25° C. (0.5 g/100 ml of solution): 1.223/1.223.

GPC (calibration against BPA polycarbonate): molecular weight $\overline{M}_w$=22962, $\overline{M}_n$=10974, heterogeneity D=2.01)

glass transition temperature $T_g$: 199° C.

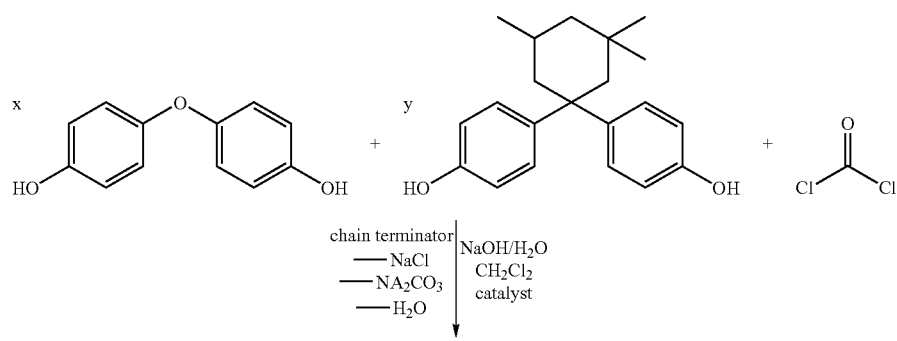

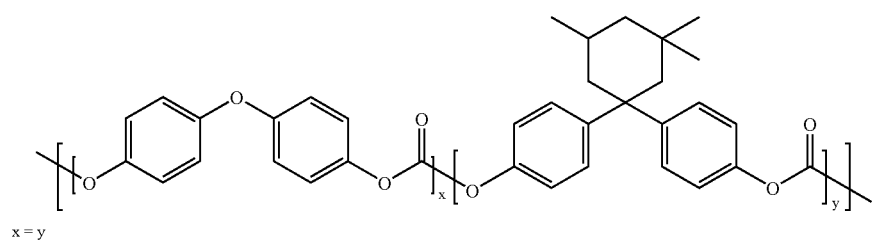

Example 5

Synthesis of a copolycarbonate from 4,4'-dihydroxydiphenyl ether/4,4'-dihydroxybiphenyl (Molar Ratio 93:7)

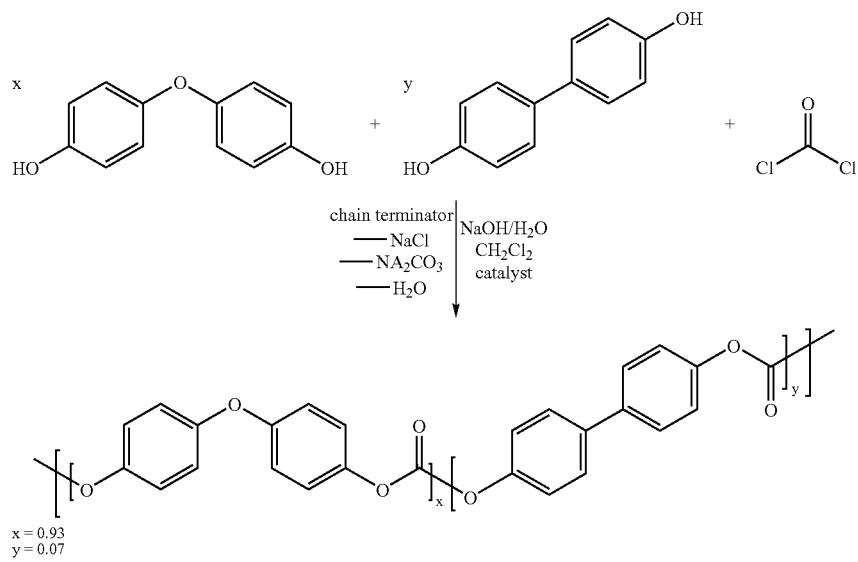

406 ml of methylene chloride are added to a solution, rendered inert with nitrogen, of 12.71 g (0.063 mol.) of 4,4'-dihydroxydiphenyl ether and 0.93 g (0.005 mol.) of 4,4'-dihydroxybiphenyl (DOD) as well as 4.4 g (0.111 mol.) of sodium hydroxide in 406 ml of water. In a one-step procedure, 0.263 g (0.00175 mol. or 3.5 mol. % relative to bisphenol) of p-tert.-butylphenol (BUP) are added as chain terminator. At a pH value of 14 and at room temperature, 6.9 ml (9.88 g, 0.099 mol.) of phosgene are added in the course of 10 minutes. In order to prevent the pH value from falling below 12, 25% sodium hydroxide solution was added during the phosgenation. When the phosgenation is complete, and after rinsing with nitrogen, 0.07 ml (0.0005 mol., 1 mol. % relative to bisphenol) of n-ethylpiperidine is added as catalyst, and stirring is then carried out for one hour. The aqueous phase is separated off, and the organic phase is acidified with phosphoric acid and washed with distilled water until neutral and free of salt. Precipitation of the polymer in methanol and drying yield 7.57 g of polycarbonate.

Analysis:
GPC (calibration against BPA polycarbonate): molecular weight $\overline{M}_w$=52173, $\overline{M}_n$=16921, heterogeneity D=3.08)

glass transition temperature $T_g$: 120° C.

Example 6

Synthesis of a copolycarbonate from 4,4'-dihydroxydiphenyl ether/4,4'-dihydroxybiphenyl (Molar Ratio 80:20)

220 ml of methylene chloride are added to a solution, rendered inert with nitrogen, of 8.088 g (0.04 mol.) of 4,4'-dihydroxydiphenyl ether and 1.826 g (0.01 mol.) of 4,4'-dihydroxybiphenyl (DOD) as well as 4.4 g (0.111 mol.) of sodium hydroxide in 220 ml of water. In a one-step procedure, 0.263 g (0.00175 mol. or 3.5 mol. % relative to bisphenol) of p-tert.-butylphenol (BUP) are added as chain terminator. At a pH value of 14 and at room temperature, 6.9 ml (9.88 g, 0.099 mol.) of phosgene are added in the course of 10 minutes. In order to prevent the pH value from falling below 12, 25% sodium hydroxide solution was added during the phosgenation. When the phosgenation is complete, and after rinsing with nitrogen, 0.07 ml (0.0005 mol., 1 mol. % relative to bisphenol) of n-ethylpiperidine is added as catalyst, and stirring is then carried out for one hour. The aqueous phase is separated off, and the organic phase is acidified with phosphoric acid and washed with distilled water until neutral and free of salt. Precipitation of the polymer in methanol and drying yield 8.55 g of polycarbonate.

Analysis:
GPC (calibration against BPA polycarbonate): molecular weight $\overline{M}$ w=38705, $\overline{M}$ n=16976, heterogeneity D=2.28)
glass transition temperature $T_g$: 114° C.
in addition liquid crystalline behaviour: phase conversion from 190° C.

Example 7

Synthesis of a copolycarbonate from 4,4'-dihydroxydiphenyl ether/4,4'-dihydroxybiphenyl (Molar Ratio 70:30)

220 ml of methylene chloride are added to a solution, rendered inert with nitrogen, of 7.077 g (0.035 mol.) of 4,4'-dihydroxydiphenyl ether and 2.793 g (0.015 mol.) of 4,4'-dihydroxybiphenyl (DOD) as well as 4.4 g (0.111 mol.) of sodium hydroxide in 220 ml of water. In a one-step procedure, 0.263 g (0.00175 mol. or 3.5 mol. % relative to bisphenol) of p-tert.-butylphenol (BUP) are added as chain terminator. At a pH value of 14 and at room temperature, 6.9 ml (9.88 g, 0.099 mol.) of phosgene are added in the course of 10 minutes. In order to prevent the pH value from falling below 12, 25% sodium hydroxide solution was added during the phosgenation. When the phosgenation is complete, and after rinsing with nitrogen, 0.07 ml (0.0005 mol., 1 mol. % relative to bisphenol) of n-ethylpiperidine is added as catalyst, and stirring is then carried out for one hour. The aqueous phase is separated off, and the organic phase is acidified with phosphoric acid and washed with distilled water until neutral and free of salt. Precipitation of the polymer in methanol and drying yield 8.7 g of polycarbonate.

Analysis:
relative solution viscosity in methylene chloride at 25° C. (0.5 g/100 ml of solution): 1.460/1.461
GPC (calibration against BPA polycarbonate): molecular weight $\overline{M}$ w=35163, $\overline{M}$ n=16189, heterogeneity D=2.17)
glass transition temperature $T_g$: 106° C.
in addition liquid crystalline behaviour: phase conversion from 200° C.

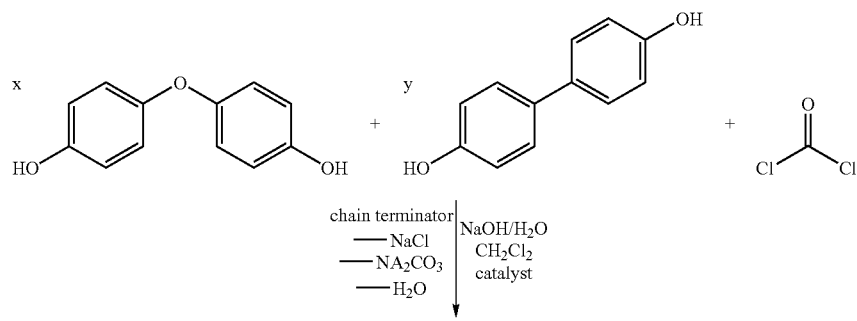

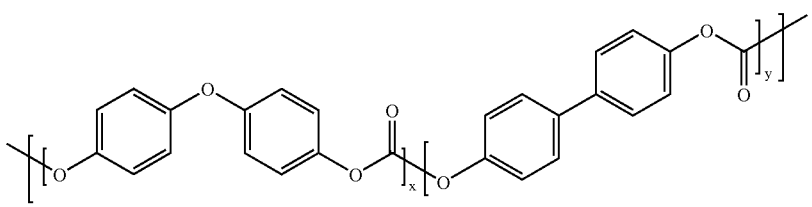

x = 0.70
y = 0.30

Example 8

Synthesis of a copolycarbonate from bisphenol A/4,4'-dihydroxydiphenyl ether (Molar Ratio 95:5)

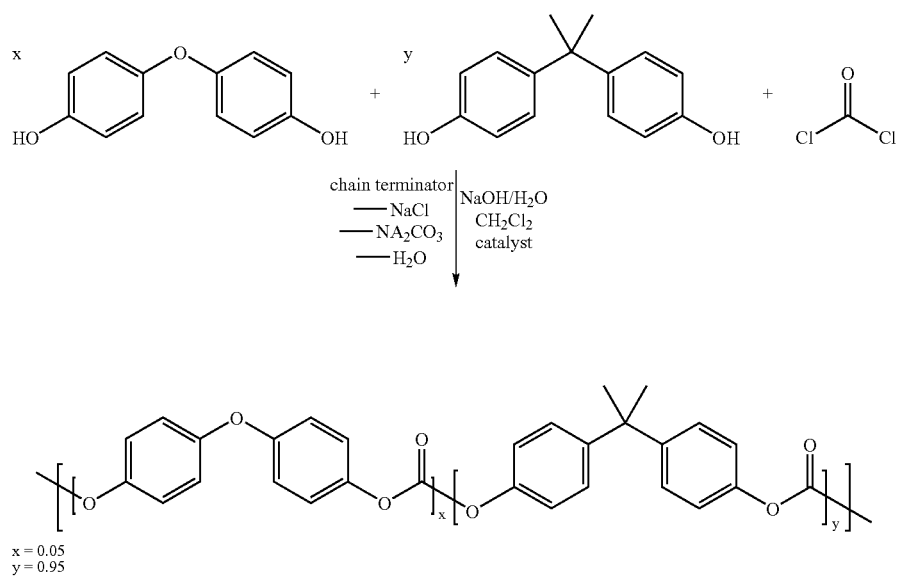

x = 0.05
y = 0.95

31 litres of methylene chloride are added to a solution, rendered inert with nitrogen, of 3903.9 g (17.1 mol.) of bisphenol A, 182 g (0.9 mol.) of 4,4'-dihydroxydiphenyl ether and 1584 g (39.6 mol.) of sodium hydroxide in 31 litres of water. In a one-step procedure, 108.14 g (0.72 mol. or 4 mol. % relative to bisphenol A) of p-tert.-butylphenol (BUP) are added as chain terminator. At a pH value of 13.4 and at 21° C., 3560 g (36 mol.) of phosgene are added in the course of 1 hour and 20 minutes. In order to prevent the pH value from falling below 12.6, 25% sodium hydroxide solution was added during the phosgenation. When the phosgenation is complete, and after rinsing with nitrogen, 24.7 ml (0.18 mol., 1 mol. % relative to bisphenol A) of n-ethylpiperidine are added as catalyst, and stirring is then carried out for one hour. The aqueous phase is separated off, and the organic phase is acidified with phosphoric acid and washed with distilled water until neutral and free of salt. After replacing the solvent with chlorobenzene, the product is extruded at 290° C. using an evaporating extruder.

3732 g of polycarbonate are obtained (after discarding first runnings).

Analysis:
relative solution viscosity in methylene chloride at a temperature of 25° C. (0.5 g/100 ml of solution): 1.277
melt volume rate (MVR) 300° C./1.2 kg: 12.4 ml/10 min
IMVR[1)] 300° C./1.2 kg 20': 12.4 ml/10 min
Vicat VSTB 50: 151.7° C.
yield stress, stretch elongation, resistance to tearing, elongation at tear and modulus of elasticity are determined from the tensile test according to ISO 527. [1)] The I in IMVR stands for intrinsic. IMVR describes the MVR with a heating time of 20 or 30 minutes as compared with 6 minutes according to standard ISO 1133 (designation IMVR 20' or IMVR 30') as the limiting value compared with the MVR according to ISO 1133.

Example 9

| Mechanical properties of the copolycarbonate from Example 8: | |
|---|---|
| notched impact strength ISO 180/4A RT [kJ/m$^2$]: | 10 × 74 z |
| yield stress: | 62 N/mm$^2$ |
| stretch elongation: | 6.4% |
| resistance to tearing: | 71 N/mm$^2$ |
| elongation at tear: | 140% |
| modulus of elasticity: | 2227 N/mm$^2$ |

For comparison purposes, the mechanical properties of polycarbonates such as Makrolon® 2405 and 2605 are given:

| Mechanical properties of Makrolon ® | 2405 | 2605 |
|---|---|---|
| notched impact strength ISO 180/4A RT [kJ/m$^2$]: | 10 × 78 z | 10 × 86 z |
| yield stress: | 65 N/mm$^2$ | 66 N/mm$^2$ |
| stretch elongation: | 6.2% | 6.3% |
| resistance to tearing: | 70 N/mm$^2$ | 75 N/mm$^2$ |
| elongation at tear: | 141% | 144% |
| modulus of elasticity: | 2348 N/mm$^2$ | 2384 N/mm$^2$ |
| Vicat VSTB 50 | 144.9° C. | 143.40° C. |

Example 10

Synthesis of a copolycarbonate from bisphenol A/4,4'-dihydroxydiphenyl ether (Molar Ratio 90:10)

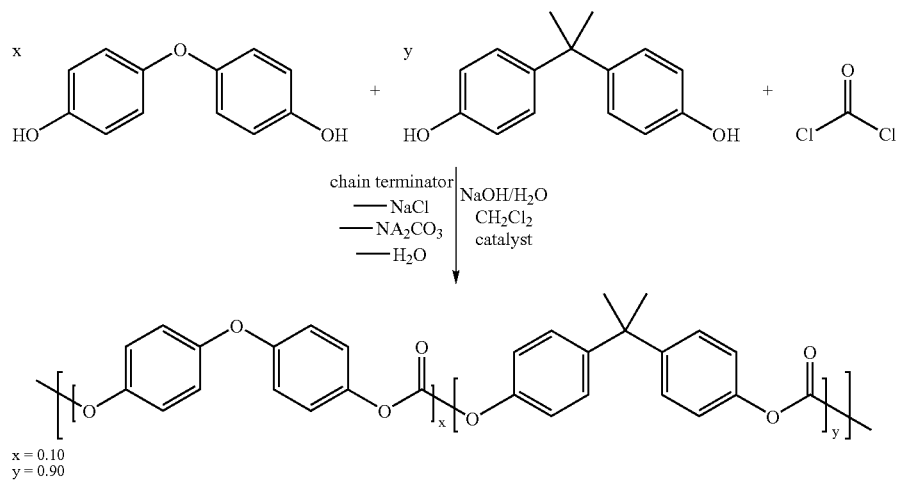

x = 0.10
y = 0.90

31 litres of methylene chloride are added to a solution, rendered inert with nitrogen, of 3698.5 g (16.2 mol.) of bisphenol A, 364 g (1.8 mol.) of 4,4'-dihydroxydiphenyl ether and 1584 g (39.6 mol.) of sodium hydroxide in 31 litres of water. In a one-step procedure, 108.14 g (0.72 mol. or 4 mol. % relative to bisphenol A) of p-tert.-butylphenol (BUP) are added as chain terminator. At a pH value of 13.4 and at 21° C., 3560 g (36 mol.) of phosgene are added in the course of 1 hour and 20 minutes. In order to prevent the pH value from falling below 12.6, 25% sodium hydroxide solution was added during the phosgenation. When the phosgenation is complete, and after rinsing with nitrogen, 24.7 ml (0.18 mol., 1 mol. % relative to bisphenol A) of n-ethylpiperidine are added as catalyst, and stirring is then carried out for one hour. The aqueous phase is separated off, and the organic phase is acidified with phosphoric acid and washed with distilled water until neutral and free of salt. After replacing the solvent with chlorobenzene, the product is extruded at 290° C. using an evaporating extruder.

Analysis:
relative solution viscosity in methylene chloride at 25° C. (0.5 g/100 ml of solution): 1.276
MVR 300° C./1.2 kg: 13.7 ml/10 min
IMVR 300° C./1.2 kg 20': 13.9 ml/10 min
Vicat VSTB 50: 147.2° C.

Example 11

| Mechanical properties of the copolycarbonate from Example 10: | |
|---|---|
| notched impact strength ISO 180/4A RT [kJ/m$^2$]: | 10 × 74 z |
| notched impact strength ISO 180/4A −20° C. [kJ/m$^2$]: | 10 × 70 z |
| notched impact strength ISO 180/4A −30° C. [kJ/m$^2$]: | 4 × 71 z/6 × 17 s |
| notched impact strength ISO 180/4A −40° C. [kJ/m$^2$]: | 10 × 16 s |
| yield stress: | 62 N/mm$^2$ |
| stretch elongation: | 6.4% |
| resistance to tearing: | 69 N/mm$^2$ |

| Mechanical properties of the copolycarbonate from Example 10: | |
|---|---|
| elongation at tear: | 135% |
| modulus of elasticity: | 2283 N/mm$^2$ |

For comparison purposes, the mechanical properties of polycarbonates such as Makrolon® 2405 and 2605 are given:

| Mechanical properties of Makrolon ® | 2405 | 2605 |
|---|---|---|
| notched impact strength ISO 180/4A RT [kJ/m$^2$]: | 10 × 78 z | 10 × 86 z |
| notched impact strength ISO 180/4A 10° C. [kJ/m$^2$]: | 7 × 74 z/3 × 14 s | 10 × 84 z |
| notched impact strength ISO 180/4A 0° C. [kJ/m$^2$]: | 10 × 14 s | 10 × 19 s |
| yield stress: | 65 N/mm$^2$ | 66 N/mm$^2$ |
| stretch elongation: | 6.2% | 6.3% |
| resistance to tearing: | 70 N/mm$^2$ | 75 N/mm$^2$ |
| elongation at tear: | 141% | 144% |
| modulus of elasticity: | 2348 N/mm$^2$ | 2384 N/mm$^2$ |
| Vicat VSTB 50 | 144.9° C. | 143.4° C. |

Example 12

Determination of the viscosity as a function of the shear rate (ISO 11443).

The copolycarbonate obtained in Example 8 is tested at 280 and 300° C. in respect of rheology. The following data are obtained:

| Shear gradient [s⁻¹] | Viscosity [Pas] 280° C. | 300° C. |
|---|---|---|
| 50 | 641 | — |
| 100 | 635 | 286 |
| 500 | 513 | 264 |
| 1000 | 409 | 232 |
| 1500 | 336 | 206 |

Example 13

Determination of the viscosity as a function of the shear rate (ISO 11443).

The copolycarbonate obtained in Example 10 is tested at 280° C. and 300° C. in respect of rheology. The following data are obtained:

| Shear gradient [s⁻¹] | Viscosity [Pas] 280° C. | 300° C. |
|---|---|---|
| 50 | 609 | — |
| 100 | 609 | — |
| 500 | 499 | 288 |
| 1000 | 392 | 252 |
| 1500 | 323 | 222 |

Example 14

Determination of the viscosity as a function of the shear rate (ISO 11443).

For comparison purposes, the mechanical properties of polycarbonates such as Makrolon® 2405 and 2605 are given:

For comparison purposes, tests are carried out at 280° C. and 300° C. in respect of rheology. The following data are obtained:

a) Makrolon® 2405 (relative solution viscosity in methylene chloride at 25° C. (0.5 g/100 ml of solution): 1.255):

| Shear gradient [s⁻¹] | Viscosity [Pas] 280° C. | 300° C. |
|---|---|---|
| 50 | — | — |
| 100 | 457 | — |
| 500 | 394 | 224 |
| 1000 | 322 | 198 |
| 1500 | 271 | 176 | b) Makrolon 2605 (relative solution viscosity in methylene chloride at 25° C. (0.5 g/100 ml of solution): 1.276):

| Shear gradient [s⁻¹] | Viscosity [Pas] 280° C. | 300° C. |
|---|---|---|
| 50 | 721 | — |
| 100 | 719 | 382 |
| 500 | 564 | 334 |
| 1000 | 434 | 282 |
| 1500 | 350 | 241 |

Example 15

Determination of the flow length with a flow spiral.

The flow path for the comparison material Makrolon® 2405 was determined as 30 cm and was used as the standard.

| Polymer | Flow spiral [cm] | Eta rel |
|---|---|---|
| Makrolon 2405 | 30 | 1.255 |
| Makrolon 2605 | 25 | 1.277 |
| Copolycarbonate from Example 8 | 26 | 1.276 |
| Copolycarbonate from Example 10 | 26.5 | 1.276 |

As will be seen from a comparison of the flow paths, the melt viscosity is lower while the molecular weight is approximately the same. Accordingly, the copolycarbonates according to the invention from Examples 8 and 10 flow more readily than the comparison material Makrolon® 2605 based on bisphenol A.

Example 16

Preparation of 3-(3'-methoxyphenyloxy)phenol

In a round-bottomed flask fitted with a Vigreux column, a reflux divider and a condenser, 77.08 g (0.70 mol.) of resorcinol are dissolved, under argon, in 250 ml of dry pyridine. 84.3 g of sodium methoxide solution in methanol (30% solution) are added dropwise to the reaction mixture, with stirring. Methanol is then removed from the reaction mixture by distillation. The reflux divider is then closed and 261.9 g (1.40 mol.) of 3-bromoanisole are added dropwise. 3.5 g (0.04 mol.) of CuCl are also added. The mixture is allowed to boil under reflux for 6 hours. Pyridine is then distilled off via the opened reflux divider, during which the sump temperature rises to 150° C. The mixture is then allowed to cool and the residue is stirred into 250 ml of semi-concentrated hydrochloric acid. The mixture is extracted with 300 ml of toluene. The organic phase is washed first with semi-concentrated hydrochloric acid and then a further two times with NaOH solution (10%). The combined alkaline phases are acidified with dilute HCl and extracted with a diethyl ether/toluene mixture (1:1). After removal of the solvent, 65.5 g of a brown oil are obtained.

$^1$H-NMR (400 MHz, CDCl$_3$) δ=7.22-7.17 (m, 1 H), 7.15-7.11 (m, 1 H), 6.67-6.52 (m, 5 H), 5.52 (s, 1 H), 3.74 (s, 3 H).

Example 17

Preparation of 3,3'-dihydroxydiphenyl ether

In a round-bottomed flask, 200 ml of hydrobromic acid (48%) are added, under argon, to 64 g (0.296 mol.) of 3-(3'-methoxyphenyloxy)-phenol. 350 ml of hydrobromic acid (33% solution in glacial acetic acid) are then added. 7.5 g (0.015 mol.) of hexadecyltributylphosphonium bromide are also added. The mixture is then heated, adjusted to the evolution of gas, at 110° C. and stirred. When the evolution of gas has ceased, water is added dropwise, with cooling. The batch is extracted five times with diethyl ether. The organic phase is shaken three times using 150 ml of 10% sodium hydroxide solution each time. This alkaline phase is acidified with 25% HCl solution and then extracted several times with diethyl ether. The organic phase is washed several times with water and finally with saturated sodium chloride solution, dried over magnesium sulfate and filtered. The solvent is removed in vacuo. The dark brown, crystalline residue is recrystallised from chloroform with the addition of a mixture of activated carbon/Tonsil. 24.4 g of a yellow solid having a melting point of 92° C. are obtained.

$^1$H-NMR (400 MHz, CDCl$_3$) δ=7.19-7.15 (m, 2 H), 6.56 (m, 4 H), 6.50-6.49 (m, 2 H), 4.95 (s, 2 H).

Example 18

Preparation of 3-hydroxy-4'-methoxydiphenyl ether 35.3 g (0.32 mol.) of resorcinol in 250 ml of pyridine are placed, under argon, in a 0.5 litre round-bottomed flask having a stirring apparatus and fitted with a Vigreux column and a distillation bridge. 38.5 g (0.21 mol.) of sodium methoxide solution (30% in methanol) are added to the solution, and the mixture is heated to 60° C. Methanol, then a portion of the pyridine are distilled off, during which the temperature rises to 111° C. 120 g (0.64 mol.) of bromobenzene and then 1.59 g of copper(I) chloride are added to the solution at 50° C. The distillation bridge is replaced by a reflux condenser and the mixture is heated under reflux for 10 hours. Pyridine is then distilled off, during which the sump temperature rises to 150° C.

The mixture is allowed to cool, and the residue is stirred into 250 ml of semi-concentrated hydrochloric acid. Extraction is carried out several times with toluene. The combined organic phases are first washed with semi-concentrated hydrochloric acid and then extracted several times with NaOH solution (10%). The combined alkaline phases are re-extracted with a toluene/diethyl ether mixture (1:1). The solvent is removed in vacuo. The crude product is passed over a silica gel column (eluant: n-hexane/ethyl acetate 1:1). After removal of the solvent, the product is dried in vacuo and 26 g of a yellow oil are obtained.

$^1$H-NMR (400 MHz, CDCl$_3$) δ=7.09-7.06 (m, 1 H), 6.95-6.91 (m, 2 H), 6.85-6.80 (m, 2 H), 6.49-6.46 (m, 2 H), 6.42-6.40 (m, 1 H), 6.16 (s, 1 H), 3.74 (s, 3 H).

Example 19

Preparation of 3,4'-dihydroxydiphenyl ether 23.8 g of 3-hydroxy-4'-methoxydiphenyl ether are dissolved under argon in a mixture of 100 ml of hydrobromic acid (48% solution) and 230 ml of hydrogen bromide in glacial acetic acid (33% solution), and the mixture is heated, adjusted to the evolution of gas, at reflux. After a total of 6 hours, 300 ml of water are added dropwise with cooling. The batch is extracted several times with diethyl ether. The organic phase is washed five times with water and once with saturated sodium chloride solution, then extracted three times with 10% sodium hydroxide solution.

The alkaline phase is acidified and then extracted several times with diethyl ether. The organic phase is washed several times with water and finally with saturated sodium chloride solution, dried over magnesium sulfate, filtered and concentrated in vacuo. 22.7 g of an ochre-coloured solid are obtained, which is passed over a glass suction filter packed with 5 cm of silica gel 60 (0.063-0.20 mm) (eluant: n-hexane/ethyl acetate 3:1). The solvent is removed in vacuo and the product is dried in vacuo. 13.0 g of a pale solid are obtained.

$^1$H-NMR (400 MHz, (CD$_3$)$_2$SO) δ=7.09-7.06 (m, 1 H), 6.88-6.85 (m, 2 H), 6.78-6.75 (m, 2 H), 6.44-6.40 (m, 1 H), 6.32-6.29 (m, 1 H), 6.26-6.24 (m, 1 H).

Example 20

Preparation of 1,3-bis(4-methoxyphenoxy)benzene 400 ml of toluene and 88.3 g (0.49 mol.) of sodium methoxide solution (30% in methanol) are placed, under argon, in a 2 litre round-bottomed flask having a 10 cm Vigreux column, a reflux divider (column head) and fitted with a reflux condenser. 27.5 g (0.25 mol.) of resorcinol are added to that solution. Methanol and toluene are distilled off via the opened reflux divider. 500 ml of pyridine are added at 110° C. to the solid that remains. 187 g (1.0 mol.) of p-bromoanisole are then rapidly added dropwise at about 35° C., and then 7.5 g (0.08 mol.) of copper(I) chloride are added. The mixture is heated to reflux and stirred for a further 9 hours.

The mixture is allowed to cool, and 600 ml of water are added. Acidification is then carried out using about 25% HCl solution, followed by extraction twice using 250 ml of hexane each time and twice using 250 ml of diethyl ether each time. The combined organic phases are dried over magnesium sulfate. The solvent is removed in vacuo. The crude product is filtered over silica gel with n-hexane as eluant. The solvent is removed in vacuo and bromoanisole contained in the product is distilled off. 22.5 g remain in the form of white crystals.

$^1$H-NMR (400 MHz, CDCl$_3$) δ=7.19-7.13 (m, 1 H), 6.99-6.96 (m, 4 H), 6.89-6.85 (m, 4 H), 6.60-6.57 (m, 3 H), 3.79 (s, 6 H).

Example 21

Preparation of 4,4'-[1,3-phenylenebis(oxy)]diphenol 22 g of the above-described compound from Example 20 are dissolved, under argon, in a mixture of 60 ml of hydrobromic acid (48% solution) and 150 ml of hydrogen bromide in glacial acetic acid (33% solution), and the mixture is heated, adjusted to the evolution of gas, at reflux. After a total of 5 hours, 300 ml of water are added dropwise, with cooling. The batch is extracted several times with a total of 400 ml of diethyl ether. The combined organic phases are washed four times using 400 ml of water each time, dried over magnesium sulfate and filtered. The solvent is removed in vacuo. 20.5 g of a crystalline solid are obtained, which was purified over a column with silica gel (0.063-0.20 mm) (eluant: n-hexane/ethyl acetate 3:1). The solvent is removed and the product is dried in vacuo. 15.8 g of a beige solid are obtained.

$^1$H-NMR (400 MHz, CDCl$_3$) δ=9.31 (s, 2 H), 7.25-7.20 (m, 1 H), 6.90-6.86 (m, 4 H), 6.79-6.75 (m, 4 H), 6.54-6.50 (m, 2 H), 6.39-6.37 (m, 1 H).

Example 22

Preparation of a Polycarbonate According to the Invention

In a flask, 15.18 g (0.0665 mol.) of 2,2-bis-(4-hydroxyphenyl)propane and 0.708 g (3.5 mmol.) of 3,3'-dihydroxydiphenyl ether are dissolved at room temperature, under a nitrogen atmosphere, in a mixture of 6.16 g of NaOH (220 mol. %, based on the total bisphenol component) in 250 ml of water. 250 ml of dichloromethane are added thereto, and stirring is carried out for 5 minutes. 0.26 g (4 mol. %, based on the total bisphenol component) of phenol dissolved in 30 ml of dichloromethane is added to the mixture. 13.85 g (200 mol. %, based on the bisphenol component) of phosgene are introduced at room temperature (20-25° C.) and with vigorous stirring. The pH value is maintained in the range of pH=12.5-13.5 by the subsequent addition of 25% NaOH solution. When the introduction is complete, the apparatus is flushed with nitrogen for 5 minutes. After a further 5 minutes, 0.0961 g (1 mol. %) of N-ethylpiperidine is added to the reaction mixture. Stirring is carried out for 60 minutes. The mixture is then diluted with dichloromethane and the organic phase is separated off. After washing the organic phase with an equal volume of 10% phosphoric acid, the organic phase is separated off and washed with water until the conductivity of the aqueous phase reaches <15 μS. ⅔ of the solvent are removed in vacuo, and the viscous solution is dried completely in a vacuum drying cabinet at 80° C. Yield: 18.2 g.

Example 23

This example corresponds to Example 22 except that the monomer from Example 19 was used instead of 3,3'-dihydroxydiphenyl ether.

Example 24

This example corresponds to Example 22 except that the monomer from Example 21 was used instead of 3,3'-dihydroxydiphenyl ether.

[1] The zero viscosity is the limiting viscosity at a viscosity extrapolated to a shear rate of zero.

Analysis:

The relative solution viscosity is determined in dichloromethane at a concentration of 5 g/l at 25° C.

The content of phenolic OH is obtained by IR measurement. For this purpose, a difference measurement of a solution of 2 g of polymer in 50 ml of dichloromethane compared with pure dichloromethane is carried out and the difference in extinction at 3582 $cm^{-1}$ is determined.

The colour index was determined as the difference in extinction at 420 nm and 700 nm in dichloromethane at a concentration of 2.4 g/50 ml and a layer thickness of 10 cm.

Example 25

41.09 g (0.18 mol.) of bisphenol A, 4.04 g (0.02 mol.) of 4,4'-dihydroxydiphenyl ether (recrystallised), 44.99 g (0.21 mol.) of diphenyl carbonate and 0.0691 g ($4 \times 10^{-3}$ mol. %) of 5% phenol solution of tetraphenylphosphonium phenolate, based on bisphenol A, are weighed into a 500 ml three-necked flask having a stirrer, an internal thermometer and a Vigreux column (30 cm, mirrored) with a bridge. The apparatus is freed of atmospheric oxygen by applying a vacuum and flushing with nitrogen (three times), and the mixture is melted at 190° C. and phenol that forms is distilled off. A vacuum of 100 mbar is then applied and distillation is continued for 20 minutes. The temperature is then raised to 235° C. and the phenol that forms is distilled off for 15 minutes. The vacuum is then adjusted to 60 mbar in the course of 5 minutes and is maintained for 15 minutes. The mixture is heated to 250° C. and the plateau is maintained for 15 minutes. The pressure is then reduced to 5 mbar for 15 minutes, whereupon heating is carried out to 280° C. After a further 15 minutes, the vacuum is reduced to 0.5 mbar and stirring is carried out for a further 15 minutes. The mixture is then heated to 300° C. and the temperature is maintained for 30 minutes. The polycarbonate is then removed at normal pressure under a nitrogen atmosphere.

| No. | Structure | BPA/monomer (molar ratio) | $\overline{M}w$ | $T_g$ | Zero viscosity[1] 270° C. |
|---|---|---|---|---|---|
| 22 | 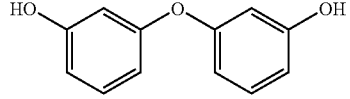 | 95/5 | 31,100 | 141° C. | 1210 Pa s |
| 23 | 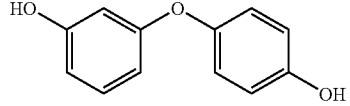 | 95/5 | 29,500 | 145° C. | 950 Pa s |
| 24 | 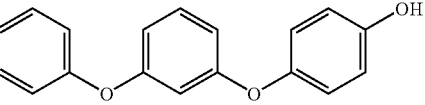 | 95/5 | 27,200 | 142° C. | 670 Pa s |
| | Makrolon ® 3108 | 100/0 | 32,000 | 148° C. | 2300 Pa s |
| | Makrolon ® 2800 | 100/0 | 28,600 | 148° C. | 1550 Pa s |
| | Makrolon ® 2600 | 100/0 | 26,800 | 148° C. | 1300 Pa s |

[1] The zero viscosity is the limiting viscosity at a viscosity extrapolated to a shear rate of zero.

ηrel: 1.247
phen. OH: 770 ppm
Tg: 144° C.

Example 26

43.38 g (0.19 mol.) of bisphenol A, 2.02 g (0.01 mol.) of 4,4'-dihydroxydiphenyl ether (recrystallised), 44.99 g (0.21 mol.) of diphenyl carbonate and 0.0691 g ($4 \times 10^{-3}$ mol. %) of 5% phenol solution of tetraphenylphosphonium phenolate, based on bisphenol A, are weighed into a 500 ml three-necked flask having a stirrer, an internal thermometer and a Vigreux column (30 cm, mirrored) with a bridge. The apparatus is freed of atmospheric oxygen by applying a vacuum and flushing with nitrogen (three times), and the mixture is melted at 190° C. and phenol that forms is distilled off. A vacuum of 100 mbar is then applied and distillation is continued for 20 minutes. The temperature is then raised to 235° C. and the phenol that forms is distilled off for 15 minutes. The vacuum is then adjusted to 60 mbar in the course of 5 minutes and maintained for 15 minutes. The mixture is heated to 250° C. and the plateau is maintained for 15 minutes. The pressure is then reduced to 5 mbar for 15 minutes, whereupon heating is carried out to 280° C. After a further 15 minutes, the vacuum is reduced to 0.5 mbar and stirring is carried out for a further 15 minutes. The mixture is then heated to 300° C. and the temperature is maintained for 30 minutes. The polycarbonate is then removed at normal pressure under a nitrogen atmosphere.

ηrel: 1.229
phen. OH: 450 ppm
Tg: 143° C.
colour index: 0.59

Example 27

31.96 g (0.14 mol.) of bisphenol A, 13.10 g (0.06 mol.) of bis-(4-hydroxyphenyl) sulfide, 46.70 g (0.22 mol.) of diphenyl carbonate and 0.0691 g ($4 \times 10^{-3}$ mol. %) of 5% phenol solution of tetraphenylphosphonium phenolate, based on bisphenol A, are weighed into a 500 ml three-necked flask having a stirrer, an internal thermometer and a Vigreux column (30 cm, mirrored) with a bridge. The apparatus is freed of atmospheric oxygen by applying a vacuum and flushing with nitrogen (three times), and the mixture is melted at 190° C. and phenol that forms is distilled off for 30 minutes. The temperature is then raised to 235° C. in the course of 10 minutes and the phenol that forms is distilled off. The mixture is then heated to 300° C. in the course of 10 minutes and at the same time the pressure is reduced to 60 mbar. In the following 10 minutes, the vacuum is reduced to 5 mbar, then to 0.5 mbar over a further 10 minutes. After 30 minutes, the polycarbonate is removed at normal pressure under a nitrogen atmosphere.

ηrel: 1.294
phen. OH: 760 ppm

| Thiobisphenol - CoPC | | | |
| --- | --- | --- | --- |
| mol. % BPA | mol. % BPS | ηrel | % OH |
| 0 | 100 | insoluble | insoluble |
| 70 | 30 | 1.294 | 0.076 |
| 50 | 50 | 1.329 | 0.063 |
| 50 | 50 | 1.252 | 0.12 |
| 25 | 75 | 1.225 | 0.14 |
| 25 | 75 | 1.366 | 0.048 |

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. An optical data storage comprising a thermoplastic copolycarbonate containing at least one unit derived from dihydroxydiphenyl ether and at least one unit derived from 4,4'-dihydroxybiphenyl and wherein the molar ratio of dihydroxydiphenyl ether to 4,4'-dihydroxybipbenyl is 93/7 to 80/20.

* * * * *